US012779725B2

(12) United States Patent
Marx et al.

(10) Patent No.: US 12,779,725 B2
(45) Date of Patent: Nov. 3, 2026

(54) SLICING MACHINE WITH SPRAY UNIT

(71) Applicant: MULTIVAC SEPP HAGGENMUELLER SE & CO. KG, Wolfertschwenden (DE)

(72) Inventors: Dominik Marx, Giessen (DE); Christian Dersch, Breidenbach (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 697 days.

(21) Appl. No.: 18/131,254

(22) Filed: Apr. 5, 2023

(65) Prior Publication Data

US 2023/0321861 A1 Oct. 12, 2023

(30) Foreign Application Priority Data

Apr. 8, 2022 (DE) ........................ 102022108508.2

(51) Int. Cl.

*B26D 7/34* (2006.01)
*B26D 1/14* (2006.01)
*B26D 3/28* (2006.01)
*B26D 5/00* (2006.01)
*B26D 7/32* (2006.01)

(52) U.S. Cl.

CPC ................ *B26D 7/34* (2013.01); *B26D 1/14* (2013.01); *B26D 3/28* (2013.01); *B26D 5/007* (2013.01); *B26D 7/32* (2013.01); *B26D 2210/02* (2013.01)

(58) Field of Classification Search

None

See application file for complete search history.

(56) References Cited

U.S. PATENT DOCUMENTS 1,158,014 A * 10/1915 Van Eulenfeld ....... A23G 9/245 118/15
1,595,696 A * 8/1926 Wakefield ................ B26D 7/34 118/15
1,796,412 A * 3/1931 Steinkellner ............. B26D 7/34 118/15
1,909,029 A * 5/1933 Walter ..................... B26D 1/28 99/545

(Continued)

FOREIGN PATENT DOCUMENTS

DE 10 2007 048 015 A1 4/2009
DE 10 2020 128 533 A1 5/2022
DE 10 2021 124 538 A1 3/2023

OTHER PUBLICATIONS

German Search Report Application No. 10 2022 108 508.2 Dated Jul. 11, 2023, English Machine Translation.

(Continued)

*Primary Examiner* — Jethro M. Pence
(74) *Attorney, Agent, or Firm* — Brooks Kushman P.C.

(57) ABSTRACT

To minimize contamination by an anticaking agent of parts of a slicing machine located away from a slice to be produced or already produced by the slicing machine, only a corresponding main surface of the slice is coated with the anticaking agent, if possible. For which purpose, an actual anticaking agent image on the main surface is automatically determined and compared by a control with a predetermined target anticaking agent image and, depending on this, a spray direction and spray distance of the spray opening from an application point are automatically corrected by the control.

17 Claims, 10 Drawing Sheets

(56) References Cited

U.S. PATENT DOCUMENTS

| | | | | | |
|---|---|---|---|---|---|
| 2,674,959 | A * | 4/1954 | Cranston, Jr. | B26D 1/29 | 99/485 |
| 3,318,351 | A * | 5/1967 | Werder | B26D 7/0641 | 414/790 |
| 3,420,209 | A | 1/1969 | Hensgen | | |
| 4,798,114 | A * | 1/1989 | Hager | B26D 7/01 | 83/522.19 |
| 5,566,600 | A * | 10/1996 | Johnson | B26D 7/0625 | 83/77 |
| 5,697,275 | A * | 12/1997 | Lindee | B26D 7/01 | 83/932 |
| 5,974,925 | A * | 11/1999 | Lindee | B26D 7/01 | 83/403.1 |
| 6,895,846 | B2 * | 5/2005 | Walker | B26D 7/0691 | 83/418 |
| 9,981,400 | B2 * | 5/2018 | Dreier | B65B 25/08 | |
| 10,442,102 | B2 * | 10/2019 | Van Buynder | A23N 15/12 | |
| 10,850,419 | B2 * | 12/2020 | Svetlik | B26D 7/32 | |
| 10,894,334 | B2 * | 1/2021 | Knura | B26D 7/0006 | |
| 11,667,047 | B2 * | 6/2023 | Mayr | B26D 1/0006 | 83/13 |
| 11,845,195 | B2 * | 12/2023 | Fox | B26D 5/02 | |
| 11,911,925 | B2 * | 2/2024 | Hartmann | B26D 7/2628 | |
| 12,076,880 | B2 * | 9/2024 | Reichard | B26D 7/325 | |
| 12,491,653 | B2 * | 12/2025 | Weiss | B26D 1/14 | |
| 2002/0166429 | A1 * | 11/2002 | Pryor | B26D 3/18 | 83/77 |
| 2008/0000337 | A1 * | 1/2008 | Dickover | B26D 1/0006 | 83/835 |
| 2011/0126679 | A1 * | 6/2011 | Weber | B26D 7/2635 | 83/13 |
| 2011/0265431 | A1 | 11/2011 | Ramabadran | | |
| 2015/0190939 | A1 * | 7/2015 | Gerlach | B26D 7/0683 | 83/13 |
| 2017/0311761 | A1 * | 11/2017 | Obersteiner | A47J 43/0716 | |
| 2022/0134590 | A1 | 5/2022 | Reichard et al. | | |
| 2023/0135169 | A1 * | 5/2023 | Mayer | B26D 7/0683 | 99/537 |
| 2023/0390954 | A1 * | 12/2023 | Hartmann | B26D 1/0006 | |

OTHER PUBLICATIONS

DE 10 2007 048 015 A1, Abstract & Machine Translation.
DE 10 2020 128 533 A1, US 2022/0134590 A1.
DE 102021 124 538 A1, Abstract & Machine Translation.
German Search Report (with English Machine Translation) Dated Jul. 11, 2023, Application No. 10 2022 108 508.2, Applicant MULTIVAC Sepp Haggenmüller SE & Co. KG, 16 Pages.

* cited by examiner

SLICING MACHINE WITH SPRAY UNIT

CROSS-REFERENCE TO RELATED APPLICATIONS

This application claims priority to German Patent Application No. DE 102022108508.2 filed on Apr. 8, 2022, the disclosure of which is incorporated in its entirety by reference herein.

TECHNICAL FIELD

The invention relates to slicing machines, in particular so-called slicers, which are used in the food industry to slice strands of an only slightly compressible product such as sausage or cheese.

BACKGROUND

Since these strands can be produced with a cross section that retains its shape and dimensions well over its length, i.e., essentially constant, they are called product calibers.

In most cases, several product calibers arranged parallel to each other on individual tracks are cut open at the same time by cutting off one slice at a time from the same blade, which moves in a transverse direction to the longitudinal direction of the product calibers.

The product calibers are pushed forward by a feed conveyor of a cutting unit in the direction of the blade of the cutting unit, usually on an obliquely downwardly directed feed conveyor, and are each guided through the product openings of a plate-shaped, so-called cutting frame, at the front end of which the part of the product caliber projecting beyond it is cut off as a slice by the blade directly in front of the cutting frame.

The slices generally fall onto a first discharge conveyor, the so-called portioning belt, as part of a discharge unit, by means of which the individual separated slices are also collected into shingled or stacked portions on the portioning belt and transported away for further processing.

In such portions, where the slices at least partially overlap, there is the problem that, depending on the material, the slices sometimes adhere to each other so strongly that the customer cannot separate them without additional measures.

In this case, either a so-called interleaver in the form of a sheet of paper or foil is placed between the individual slices as a separation aid when the portion is prepared, or a liquid or powdered separating agent is applied to the contact surface of the slice.

SUMMARY

It is therefore the object of the invention to provide a slicing machine, in particular a slicer, which is capable of dealing with the above-mentioned problem and at the same time exhibits a high degree of process reliability.

A generic slicing machine, such as a slicer, for slicing calibers-usually several calibers lying parallel to one another in different tracks-into slices and depositing them in shingled or stacked portions typically comprises

- a cutting unit with a preferably rotating blade, usually a sickle blade, whose cutting edge on the outer circumference increases in its distance from the center of rotation in the direction opposite to the direction of rotation
- a feed unit for feeding the at least one caliber to be cut to the cutting unit, and
- a discharge unit, with at least one discharge conveyor,
- a control for controlling moving parts of the slicing machine.

In order to minimize adhesion of the slices within the portions and to make it easier for the consumer to remove individual slices, a liquid or powdery anticaking agent is applied between the slices of a portion either before the next slice is placed on the upper side of the preceding slice and/or before the next slice hits its lower side.

For this purpose, the slicing machine may, as is known, have a spray unit with at least one spray opening for dispensing the anticaking agent.

The spray unit is usually located at an angle between the obliquely overhanging front surface of the cutting frame—which generally forms part of the feed unit—or the cutting plane in which the cutting edge of the blade moves, and the portioning belt.

The spray unit is preferably arranged and embodied in such a way that the at least one spray opening applies anticaking agent in the direction of one, in particular only one, main surface of an existing slice or a slice still to be produced.

In this context, the two main surfaces of a slice are understood to be the surfaces of the slice which lie opposite one another, run approximately parallel to one another and are each substantially larger than its circumferential surface.

A slice still to be produced is the beginning of the caliber, i.e., its front face, which, after the slice has been cut off, represents one of the two main faces of the slice.

Spray unit and spray opening are understood to mean any unit or nozzle by means of which an anticaking agent can be applied, irrespective of whether this is a nozzle in the classical sense with a narrowing passage opening and irrespective of whether the anticaking agent is applied under pressure. Thus, a simple, pressureless trickling of a powdered or liquid anticaking agent, e.g., onto the upper side of the last deposited slice, can also be effected by such a spray unit, but in practice the anticaking agent must be moved against the slice at a considerable speed—much higher than the falling speed from a low elevation of at most 30 cm—since the time available for the application of the anticaking agent is very short.

In the case of pressurized application, the anticaking agent—whether liquid or powder—is often finely atomized with the aid of compressed air or another pressurized medium with the aid of the spray nozzle, for which purpose the spray opening must be supplied not only with the anticaking agent itself but also with this pressurized medium—referred to below as compressed air irrespective of the type of pressurized medium—via a corresponding supply line.

The basic idea of the invention is, in the case of a generic slicing machine—hereinafter referred to only as a slicer, without limiting the invention thereto—to include, in addition to the usual assemblies such as a

- cutting unit
- feed unit for feeding the at least one caliber to be sliced to the cutting unit
- discharge conveyor for discharging the cut slices or portions made up thereof
- and a control for controlling moving parts of the slicing machine also has at least one spray opening for applying a liquid or powdered anticaking agent to at least one of the two main surfaces of a slice in each case, in order to reduce the cleaning effort and the associated downtimes of the machine, in that the machine is soiled as little as possible by the anticaking agent.

Although the spray opening is used to apply the anticaking agent specifically in the direction of the main surface of the slice to be coated, in particular by spraying in this direction with overpressure, part of the anticaking agent flies past the main surface and is deposited on the surrounding parts of the machine, some of which are far away from the spray point due to the air movements, and has to be removed from there.

The slice on which the anticaking agent is to be applied can be an already existing slice on which the anticaking agent is applied either if it is already lying on the discharge conveyor—then on the upward—facing and accessible main surface of the slice—or in its fall path from the cutting unit in the direction of the discharge conveyor—then on the downward—facing main surface which has already been accessible since the start of the cutting process—or also a virtual slice which is still part of the caliber or at least still connected to it, since it has not yet been completely separated from the caliber. In this case, the main surface to be coated is the front face of the caliber projecting from the cutting frame.

In a slicing machine according to the invention, the spray unit and the control system controlling it are embodied in such a way that the main surfaces of the slices can be coated as completely as possible with anticaking agent, but as little anticaking agent as possible passes the main surface and thus as few parts of the machine away from the slices as possible are exposed to anticaking agent.

For this purpose, the at least one spray opening is preferably positioned in its spray direction and/or in its spray distance from the application point, i.e., the main surface of the slice to be coated—in relation to the machine parts to the cutting plane, in particular the front side of the product opening in the cutting frame—and/or the support surface on the discharge conveyor on which the slice is deposited—can be automatically adjusted, preferably also during the slicing operation of the machine, in particular during the slicing of the at least one caliber.

A separate spray opening is provided for each main surface to be coated, i.e., in the case of the usually multi-track slicers, a spray opening is provided in the spray unit for each track in order to be able to align its spray cone with the desired main surface of the slice.

As a rule, the main surface is round or square, in which case it is usually nearly square, in which case a spray opening, in particular a spray nozzle, is generally used which emits a spray cone with a round cross section. However, in the case of strongly elongated, approximately oblong-rectangular, cross sections of the main surface, slit-shaped spray openings or spray nozzles can also be used, which emit a spray cone with an approximately elliptical cross section.

In general, the spray opening or spray nozzle is selected and dimensioned so that the cross section of its spray cone is matched as closely as possible to the cross sectional relations of the main surface to be coated.

If the slice already lying on the discharge conveyor is to be coated on its upward— facing main surface, the spray unit, and in particular the spray opening, is located above the deposit surface on the discharge conveyor. The main surfaces of a slice are the largest surfaces of a slice which are approximately parallel to one another. In a discharge unit with usually three discharge conveyors arranged one behind the other in the transport direction, of which the rear—most conveyor in the transport direction is embodied as a portioning belt for forming portions, the spray cone must be directed at the deposit surface of this portioning belt, because the slices are arranged there partly lying on top of one another in portions, and in this case that excessive adhesion of the slices to one another is to be avoided.

Since there is hardly any space available exactly above this because of the overhanging cutting plane and cutting wedge, the spray unit with the one or more spray openings will be positioned offset in the transport direction in the direction of the next discharge conveyor with a spray direction obliquely downwards against the passage direction through machine.

If, on the other hand, the front, downward—facing main surface of the slice is to be coated already in the fall path or still in the state in which it is at least partially a constituent part of the caliber, the at least one spray opening is arranged with a spray direction obliquely upward and directed against the passage direction in front of the cutting plane and the cutting frame, usually above the second discharge conveyor of the discharge unit in the passage direction.

In order to coat as far as possible only the desired main surface and to effect this by means of automatic adjustment, there is preferably a detection unit which is capable of detecting the interface area produced by the at least one spray opening on the main surface of the slice, i.e., the interface image, with respect to its size and position on the main surface.

Usually this will be a camera, which must be embodied to distinguish the part of the main surface that is coated by anticaking agent from a part that is not coated.

This is the case if the anticaking agent differs from the non-coated surface of the slice, for example in its color, its reflective behavior or another optically detectable parameter.

On the other hand, the anticaking agent should be as undetectable as possible to the customer.

In order to achieve both goals at the same time, for example, in the case of an anticaking agent in powder form, the anticaking agent can only be distinguished from the surface of the slice by its color or other optical parameter as long as it has not yet been absorbed by the—usually somewhat moist—slice, i.e., immediately after application. Then the detection unit must capture the actual release image on the slide in exactly this time window.

The situation is similar with a liquid anticaking agent:

The liquid layer initially lying on the slice has a significantly different reflection behavior than the non-coated surface of the slice, and can therefore be detected optically until it is absorbed by the slice.

Another possibility is that the anticaking agent contains substances—permissible under food law—that are not visible to the human eye, but can be detected by means of a camera or other sensor operating by means of an electromagnetic frequency tuned to it.

Preferably, the control is then able to adjust the spray direction and/or the spray distance of the spray opening by comparing the determined actual interface image with a predetermined target interface image in such a way that the actual state of the interface image corresponds to the target state, which requires constant checking and readjustment and does not have to be achieved in one step.

For example, if the determined interface image is centered on the main surface, but is smaller than main surface, the control will leave the spray direction unchanged, but move the spray opening to a greater distance from the surface to be coated, opposite to the spray direction.

If anticaking agent is also detected away from the surface to be coated, for example on the deposit surface of the discharge conveyor, when the desired surface is completely coated, the procedure is reversed, i.e., the distance of the spray opening along the spray direction to the spray point is reduced to the surface to be coated.

If the interface surface coated with anticaking agent is eccentrically located on the surface to be coated, in particular the main surface of the bearing, the spray direction is changed—if necessary additionally—so that a centric position is achieved.

A further object to be mastered by the control is to coat a main surface with anticaking agent only once and not several times, and/or to apply anticaking agent by means of the anticaking agent opening only—which is usually done in batches, i.e., with only one burst per main surface—if a slice with a main surface not yet coated with anticaking agent is located at the point of impact for the anticaking agent.

If coating is to take place with a slice lying on the discharge conveyor, there may be no slice at the point of impact for the anticaking agent at the moment, for example because an empty cut has just been made, and then the control should also not apply any anticaking agent.

For the same reason, the front face of the caliber pointing in the direction of the discharge conveyor unit may be present in the cutting frame—with protrusion to the front—but may already have been coated with anticaking agent by means of the previous discharge stroke. Even then, no recoating and no shot of anticaking agent through the discharge opening is necessary and must be prevented by the control system.

For simple assembly and easy cleaning, the spray unit is preferably arranged in or on a spray bar passing through all tracks in the transverse direction, in particular inside a hollow, tightly closable spray bar, and this spray bar is preferably fixed in an automatically controlled adjustable manner to a holding device opposite the base frame of the machine.

The holding device itself can be rod-shaped and be fastened at one end to the base frame and at the other end section carry the spray bar, which then preferably projects at an angle, approximately at right angles, with its direction of extension relative to the main direction of extension of the rod-shaped holding device.

The spray bar should then preferably be automatically pivotable in a controlled manner about its longitudinal direction, which is in particular the transverse direction of the machine, relative to the holding device and/or be automatically adjustable in a controlled manner along the main direction of extension, the longitudinal direction, of the holding device.

This means that—particularly if the longitudinal extension of the rod-shaped holding device or at least a part thereof is aligned in the spray direction—the spray distance can be changed by displacement along the holding device and the spray direction can be changed by pivoting the spray bar.

To enable the spray distance to be changed along the spray direction, the holding device preferably comprises a main arm, which is attached to the base frame of the machine, and a pivoting arm, which is attached to the free end section of the main arm and in whose free end section the spray bar is located.

By pivoting the pivoting arm relative to the main arm about an axis running in the transverse direction, the pivoting arm can be adjusted with its direction of travel parallel to the spray direction, whereby the latter usually does not necessarily have to be controlled automatically, but can also be carried out manually once before the start of a cutting order.

To change the spray distance, the preferably rod-shaped holding device, in particular its pivoting arm, can be embodied to be adjustable in length, in particular telescopic, to make it easier to set the spray bar in the correct basic position relative to the application surface for the anticaking agent.

For this purpose, the main arm can in turn consist of a base part fixed to the base frame and a support part adjustable relative to the base part, in particular in the longitudinal direction.

This adjustment can, but does not necessarily have to, be carried out automatically in a controlled manner; a manual adjustment option is also sufficient here, which is then carried out before the start of the slicing operation.

For good accessibility into the machine, the spray bar can be attached to the holding device at only one point along its length, in particular in one of its end sections, i.e., cantilevered from the latter on one side, the holding device preferably being located on the operator side of the machine when the basic position of the spray bar is set manually.

The necessary contacts of the spray unit for anticaking agent and/or electrical signals and/or electrical current and/or compressed air—which is mostly used as transport medium for the anticaking agent—are then present in particular in this mounting section, in particular this end section of the spray bar, in particular in an end face of the spray bar.

Preferably, the spray direction of each individual spray opening is also adjustable and adjustable relative to the spray bar, in particular from the outside of the spray bar, which however is preferably not done automatically, but manually, in order to be able to carry out an initial basic adjustment of the spray unit easily.

In order to be able to carry out the basic setting as well as possible and as accurately as possible with regard to the spray direction, the spray bar, in particular assigned to each of its spray openings, can each comprise a non-contact pointing device, such as a laser pointer, which indicates to the operator the point of impact of the spray direction on the application point with an optically recognizable beam.

With regard to the method, this object is solved in that in a generic slicer with spray unit, in particular the slicer described above, the main surface of the slice to be coated is coated as completely as possible with anticaking agent and/or as little anticaking agent as possible is delivered away from the slices.

In particular, for this purpose the spray direction and/or the spray distance of the at least one spray opening is automatically adjusted accordingly by the control, preferably during slicing operation of the machine, in particular during slicing of a caliber or also in the slicing pause during loading of the machine with new calibers.

This adjustment is preferably carried out on the basis of a comparison of the control of the existing actual slice image on the desired application point, in particular a main surface of the slice, with a predetermined target slice image.

For this purpose, the current actual application image is determined with the aid of the control or corresponding sensor system, in particular during the slicing operation of the machine and in the machine.

Preferably, the presence of a main surface of a slice—not yet coated with anticaking agent—is checked at the application position prior to dispensing anticaking agent, and anticaking agent is applied to the main surface only in the positive case.

The application of anticaking agent is preferably carried out in batches, whereby the batch or shot of anticaking agent is only applied if the main surface concerned is also located at the application position for anticaking agent, which is particularly important if the anticaking agent is applied to the slice during its fall path from the cutting plane to the discharge conveyor.

When the anticaking agent is applied to the face of the caliber, due to the short time between two cuts of the blade, the delivery of anticaking agent from the spray opening, i.e., the anticaking agent shot, must already be started, while the blade cutting off the previous slice still covers the newly created face of the caliber completely or partially.

Preferably, when changing over to a new product and/or changing the number of tracks and/or the distance between the tracks, the spray unit, in particular a spray bar in which the spray unit is housed, is completely changed or the basic setting of the spray unit, in particular of the spray bar, is manually adapted to the new job.

In particular, the corresponding setting values for the spray unit, including the relative position of the spray bar to the base frame and thus the settings on its holding device, are stored in the control system for each work order in order to be able to display them at least to the operator if this basic setting is carried out manually, and of course even more so if this basic setting is also carried out automatically and controlled by means of correspondingly available controlled drives.

BRIEF DESCRIPTION OF THE DRAWINGS

Embodiments according to the invention are described in more detail below by way of example. They show.

DETAILED DESCRIPTION

Figure 1A:
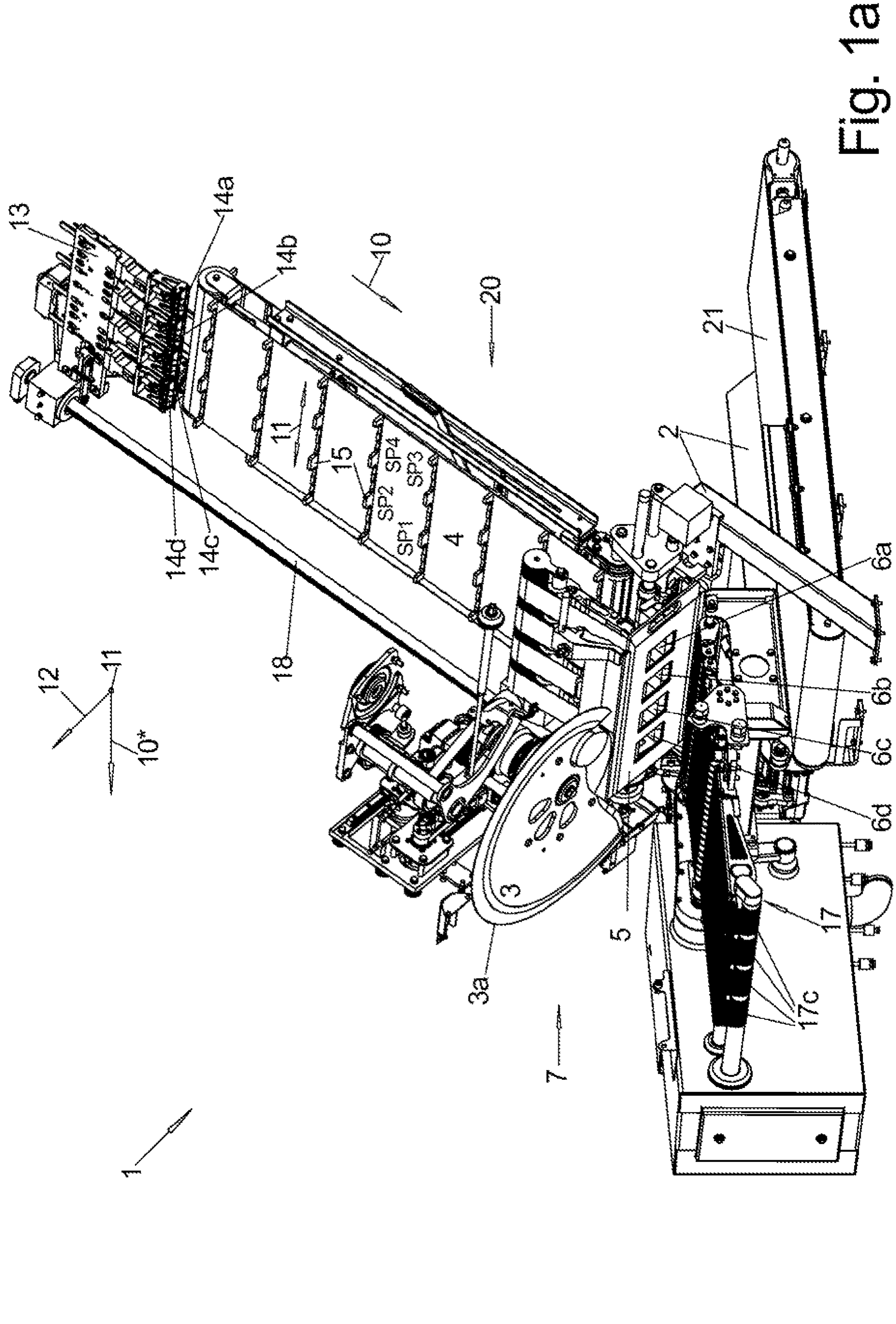
FIGS. 1*a, b*: a slicing machine in the form of a slicer according to the prior art in different perspective views, with the feed belt folded up into the slicing position.
Figure 1B:
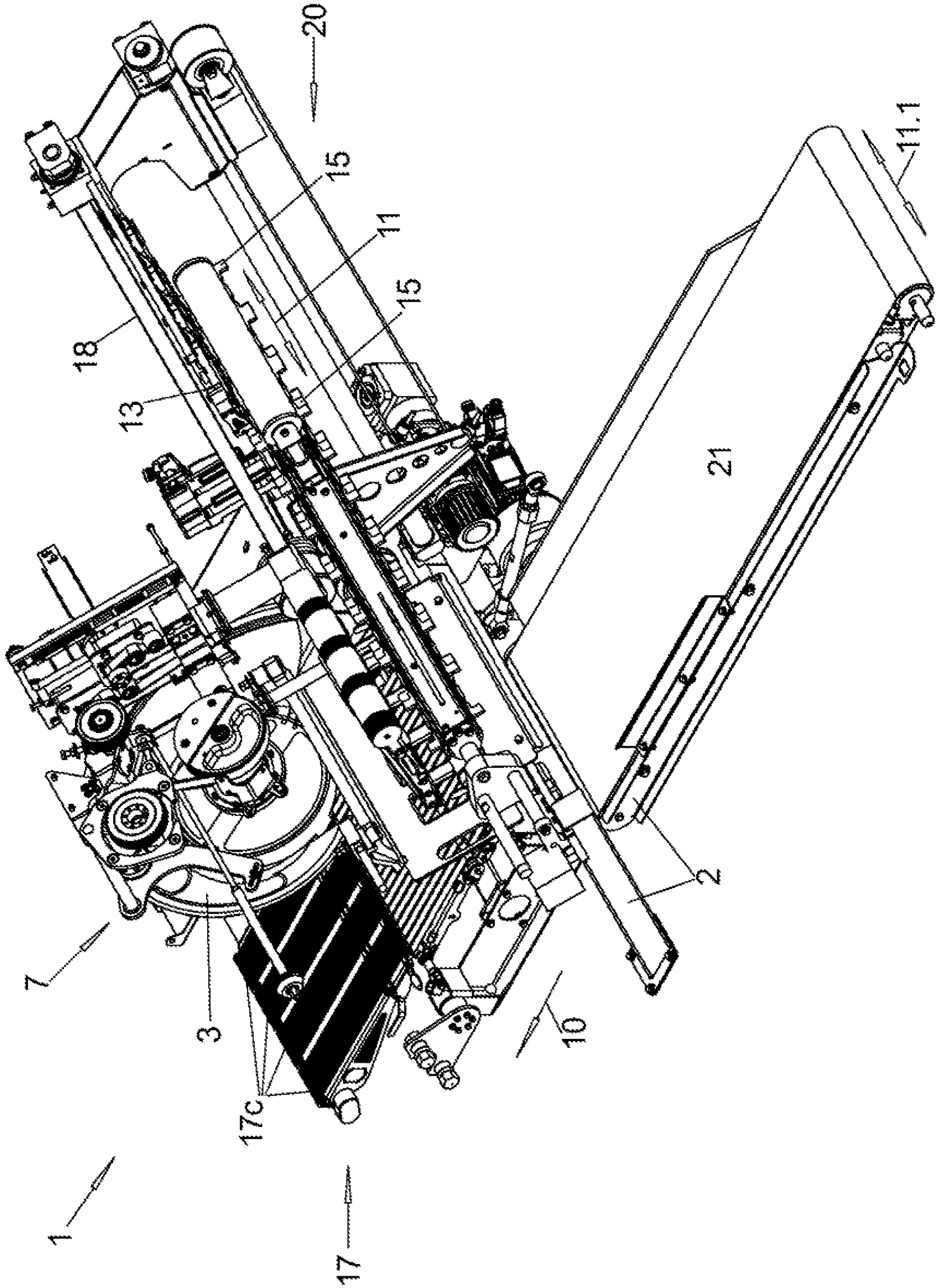
FIG. 1*c*: the slicing machine of FIGS. 1*a, b* in side view with the cladding parts removed so that the different conveyor belts can be seen more clearly.

FIGS. 1*a*, 1*b* show different perspective views of a multi-track slicer 1 for simultaneous slicing of several product calibers K on one track SP1 to SP4 next to each other and depositing them in shingled portions P each consisting of several slices S with a general passage direction 10* through the slicer 1 from right to left.

Figure 1C:
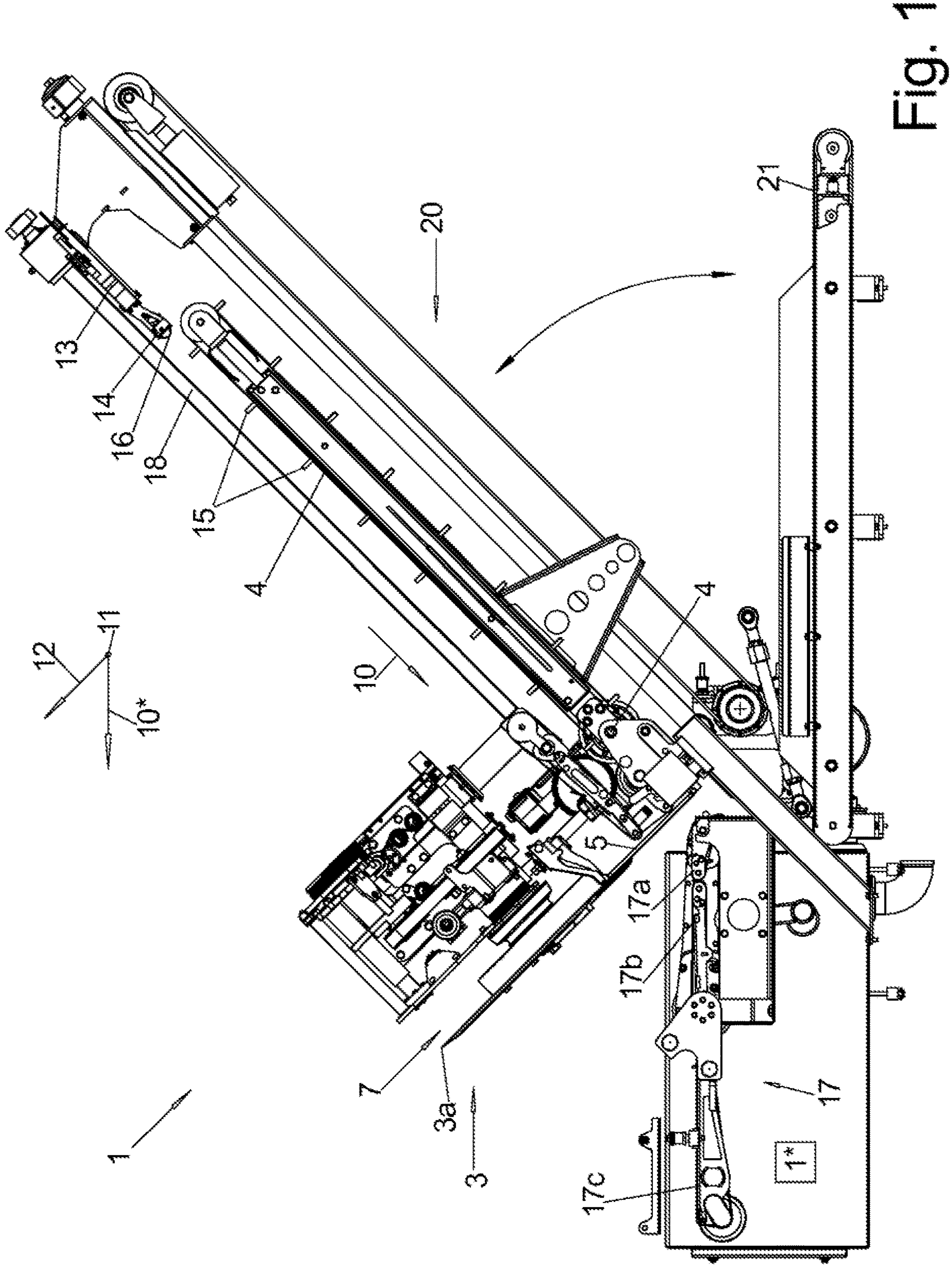
Figure 2A:
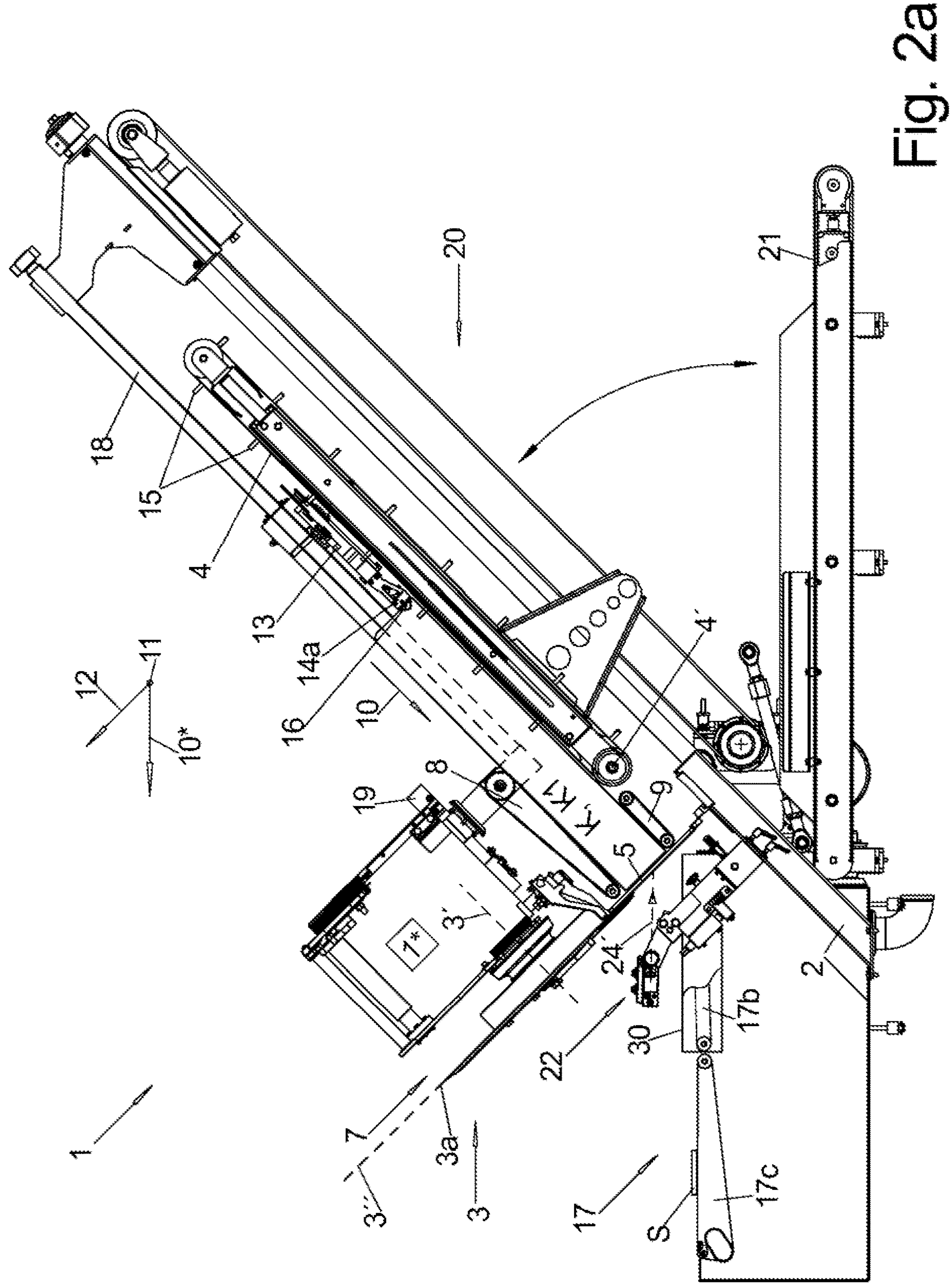
FIG. 2*a*: a simplified side view of the slicing machine compared to FIG. 1*c*, loaded with a product caliber and with an additional spray unit, which is in a first functional position.

FIG. 1*c* and FIG. 2*a* show—without and with the caliber K inserted—a side view of this slicer 1, omitting covers and other parts not relevant to the invention, which are attached to the base frame 2 like all other components, so that the functional parts, especially the conveyor belts, can be seen more clearly. The longitudinal direction 10 is the feed direction of the calibers K to the cutting unit 7 and thus also the longitudinal direction of the calibers K lying in the slicer 1.

It can be seen that the basic structure of a slicer 1 according to the state of the art is that a cutting unit 7 with blades 3 rotating about a blade axis 3', such as a sickle blade 3, is provided with several, in this case four, blades, product calibers K, in this case four, lying side by side transversely to the feeding direction 10 on a feed conveyor 4 with spacers 15 of the feed conveyor 4 between them are fed by this feed unit 20, from the front ends of which the rotating blade 3 cuts off a slice S with its cutting edge 3*a* in each case in one operation, i.e., almost simultaneously. The feed or feeding direction 10 may also be considered a transport direction of the slicer 1, in particular a transport direction of the feed unit 20.

Figure 2B:
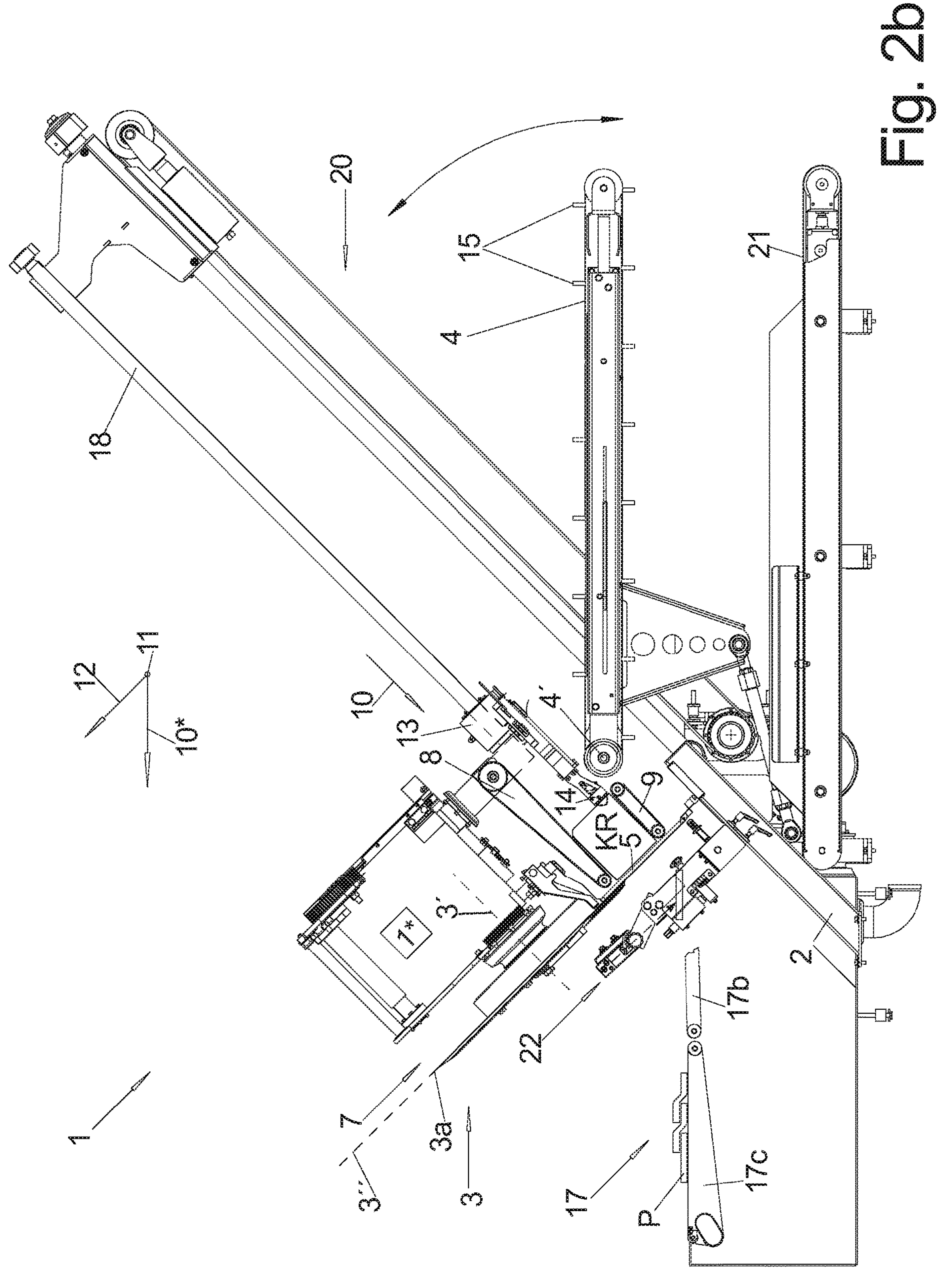
FIG. 2*b*: a side view as in FIG. 2*a*, but with the infeed belt folded down into the loading position and the product caliber cut open except for a caliber remnant, with the additional spray unit located in a second functional position.

For the cutting of the product calibers K, the feed conveyor 4 is in the cutting position shown in FIGS. 1*a*-2*a*, which is oblique in side view with a low-lying front end on the cutting side and a high-lying rear end, from which it can be folded down about a pivot axis 4' running in its width direction, the first transverse direction 11, which is located in the vicinity of the cutting unit 7, into an approximately horizontal loading position as shown in FIG. 2*b*.

The rear end of each caliber K lying in the feed unit 20 is held positively by a gripper 14*a-d* with the aid of gripper claws 16 as shown in FIG. 2*a*. These grippers 14*a*-14*d*, which can be activated and deactivated with respect to the position of the gripper claws 16, are attached to a common gripper slide 13, which can be moved along a gripper guide 18 in the feeding direction 10.

Both the feed of the gripper slide 13 and of the feed conveyor 4 can be driven in a controlled manner, but the actual feed speed of the calibers K is effected by a so-called upper and lower product guide 8, 9, which are also driven in a controlled manner and engage on the upper side and lower side of the calibers K to be cut open in their front end sections near the cutting unit 7.

The front ends of the calibers K are each guided through a so-called slit opening 6*a-d* of a plate-shaped cutting frame 5, the cutting plane 3" running immediately in front of the front, obliquely downward—pointing end face of the cutting frame 5, in which cutting plane the blade 3 rotates with its cutting edge 3*a* and thus cuts off the protrusion of the calibers K from the cutting frame 5 as a slice S. The cutting plane 3" runs perpendicular to the upper run of the feed conveyor 4 and/or is spanned by the two transverse directions 11, 12 to the feeding direction 10.

The inner circumference of the eyeglass openings 6*a-d* of the cutting edge 3*a* of the blade 3 serves as a counter cutting edge.

Since both product guides 8, 9 can be driven in a controlled manner, in particular independently of one another and/or possibly separately for each track SP1 to SP4, they determine the—continuous or clocked—feed speed of the calibers K through the cutting frame 5.

The upper product guide 8 is displaceable in the 2. transverse direction 12—which is perpendicular to the surface of the upper run of the infeed conveyor 4—for adaptation to the height H of the caliber K in this direction. Furthermore, at least one of the product guides 8, 9 can be embodied to be pivotable about one of its deflecting rollers in order to be able to change the direction of the strand of its guide belt lying against the caliber K to a limited extent.

Below the feed conveyor unit 20 there is usually an approximately horizontally running residue conveyor 21, which starts with its front end below the cutting frame 5 and directly below or behind the discharge conveyor unit 17 and with its upper run thereon—by means of the drive of one of the discharge conveyors 17 against the passage direction 10*— transports away falling residues to the rear.

The slices S standing at an angle in space during separation fall onto a discharge unit 17 starting below the cutting frame 5 and running in passage direction 10*, which in this case consists of several discharge conveyors 17*a, b, c* arranged one behind the other with their upper runs approximately in alignment in passage direction 10*, of which the first discharge conveyor 17*a* in passage direction 10* can be embodied as a portioning belt 17*a* and/or one can also be embodied as a weighing unit.

The slices S can hit the discharge conveyor 17 individually and at a distance from each other in the passage direction 10* or, by appropriate control of the portioning belt 17*a* of the discharge unit 17—the movement of which, like almost all moving parts, is controlled by the control 1*—form shingled or stacked portions P, by stepwise forward movement of the portioning belt 17*a*.

Figure 4A:
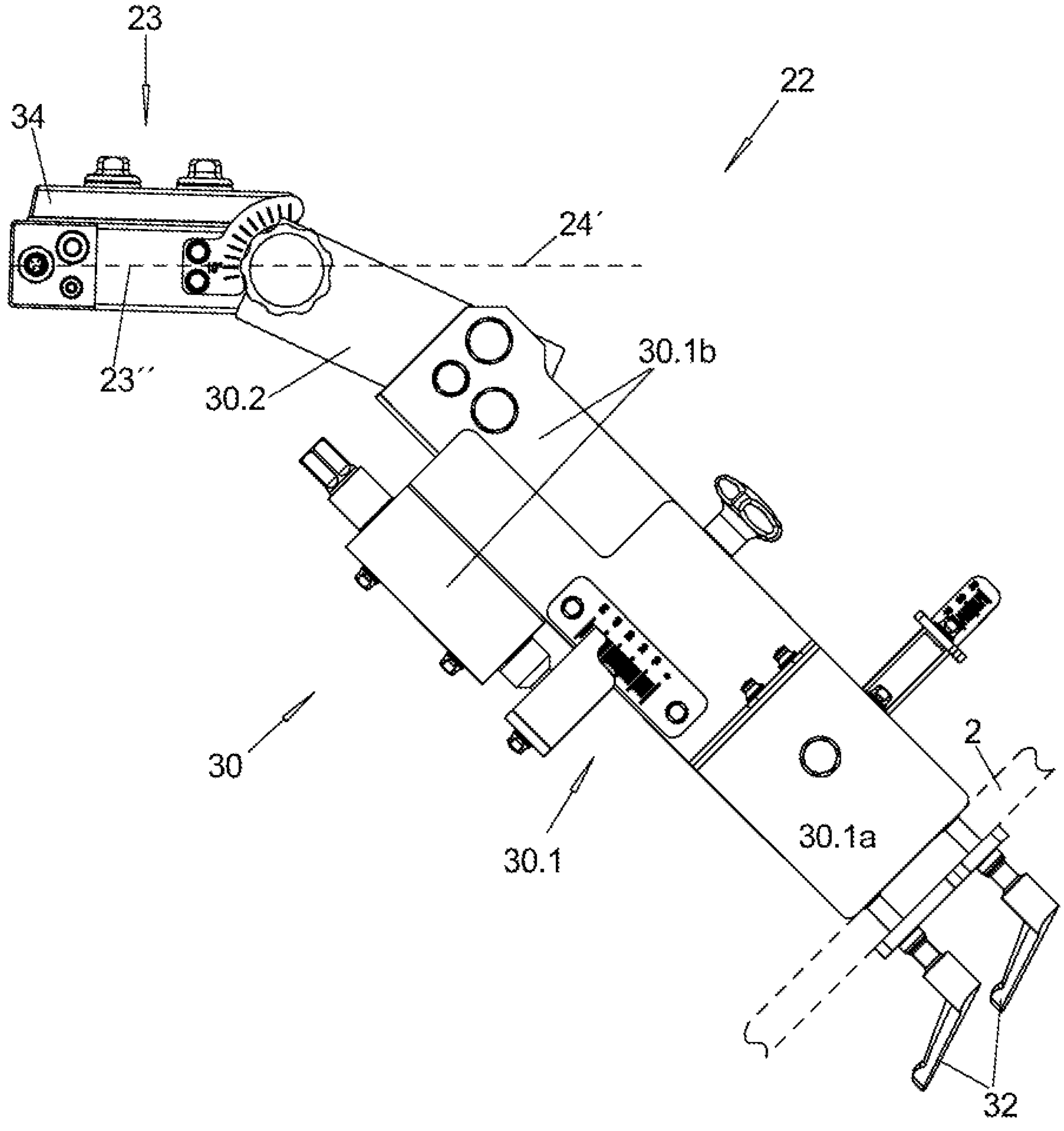
Figure 4B:
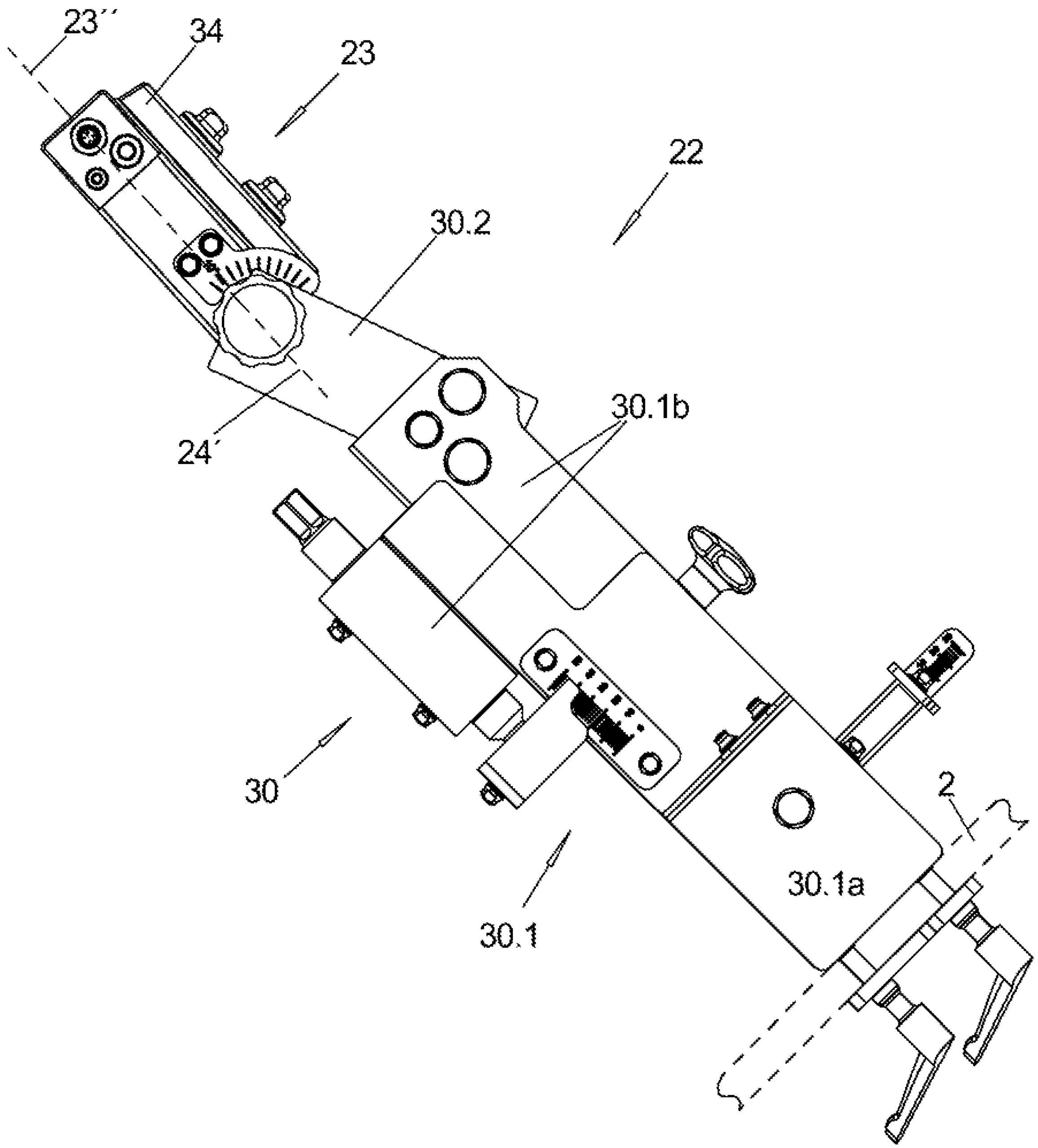

In the two side views of FIGS. 2*a* and 2*b*, compared with FIGS. 1*a*—c, a spray unit 22 for applying an anticaking agent T to the slices S is additionally drawn in each case, in FIG. 2*a* in the functional position according to the enlarged individual representation of FIG. 4*a* and in FIG. 2*b* in the functional position according to the enlarged representation of FIG. 4*b*.

Figure 3A:
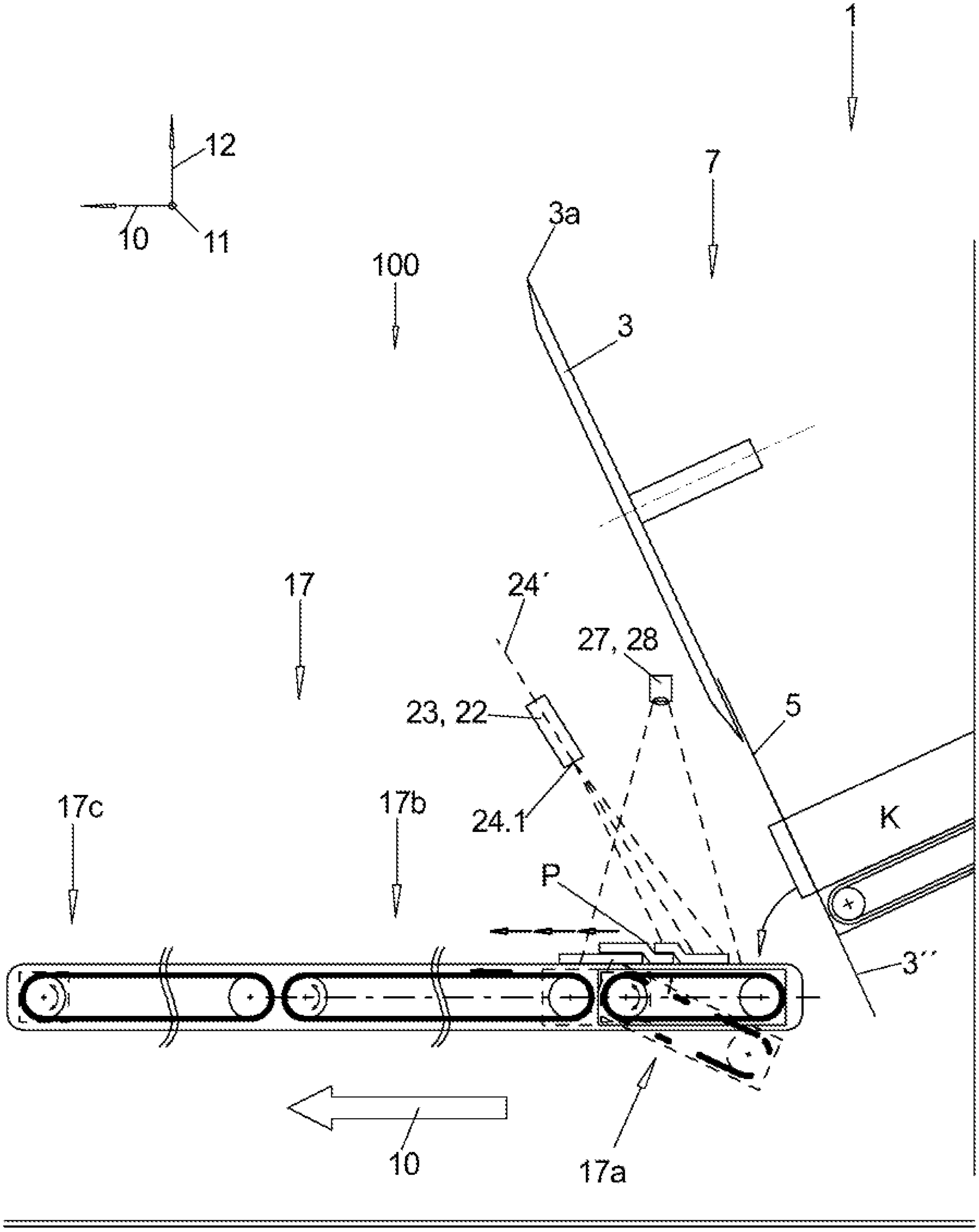
FIG. 3*a*: the application situation for the anticaking agent with a spray unit in principle representation in the side view.

FIGS. 3*a, b* show the situation when applying anticaking agent T to a slice S— here circular—lying on a discharge conveyor, enlarged in side view and top view.

According to FIGS. 1*c* and 2*a, b*, the discharge unit 17 consists of three conveyor belts arranged one behind the other in the transport direction 10, of which the rearmost in the passage direction 10* is embodied as a portioning belt 17*a*, i.e., it is capable of producing shingled or stacked portions from the individual slices falling from the cutting unit 7 by controlled, stepwise forward travel.

In this process, an anticaking agent T is to be applied over as large an area as possible to the upward—facing main side S1 of each slice S immediately after it strikes the portioning belt 17*a*, preferably before the latter moves forward one step with the new slice S, and of course before the next slice strikes.

Accordingly, the predetermined target anticaking agent image Bsoll is a circular area coated with anticaking agent T on this main surface S1, which corresponds essentially to the entire upwardly facing main surface S1 of the slice S.

The spray unit 22 with the at least one spray opening 24.1 in the direction of view of FIG. 3*a*, i.e., in the transverse direction 11, emits therefrom a conical jet of an anticaking agent T— in powder form and transported by means of compressed air or in liquid form—which also has, for example, a circular cross section. The center axis and line of symmetry of this cone is the spray direction 24'.

Because of the overhanging cutting plane 3" and cutting frame 5, the spray unit 22 is not arranged in the longitudinal area above the portioning belt 17*a*, but slightly offset in the transport direction 10 above the start of the next discharge conveyor 17*b*.

After the spray unit 22 has been set, usually manually, before the start of a job, for example a batch of calibers K to be cut, an approximately circular area, the actual anticaking agent image Bist, should be coated with anticaking agent T on the main surface S1 of the slice S at the start of the cutting operation by means of one shot or burst of anticaking agent T delivered.

By means of a detection unit 27, such as a camera 27, the control 1* can check whether or not the actual anticaking agent image Bist already corresponds—within a predetermined tolerance—to the target anticaking agent image Bsoll in terms of position and size.

Figure 3B:
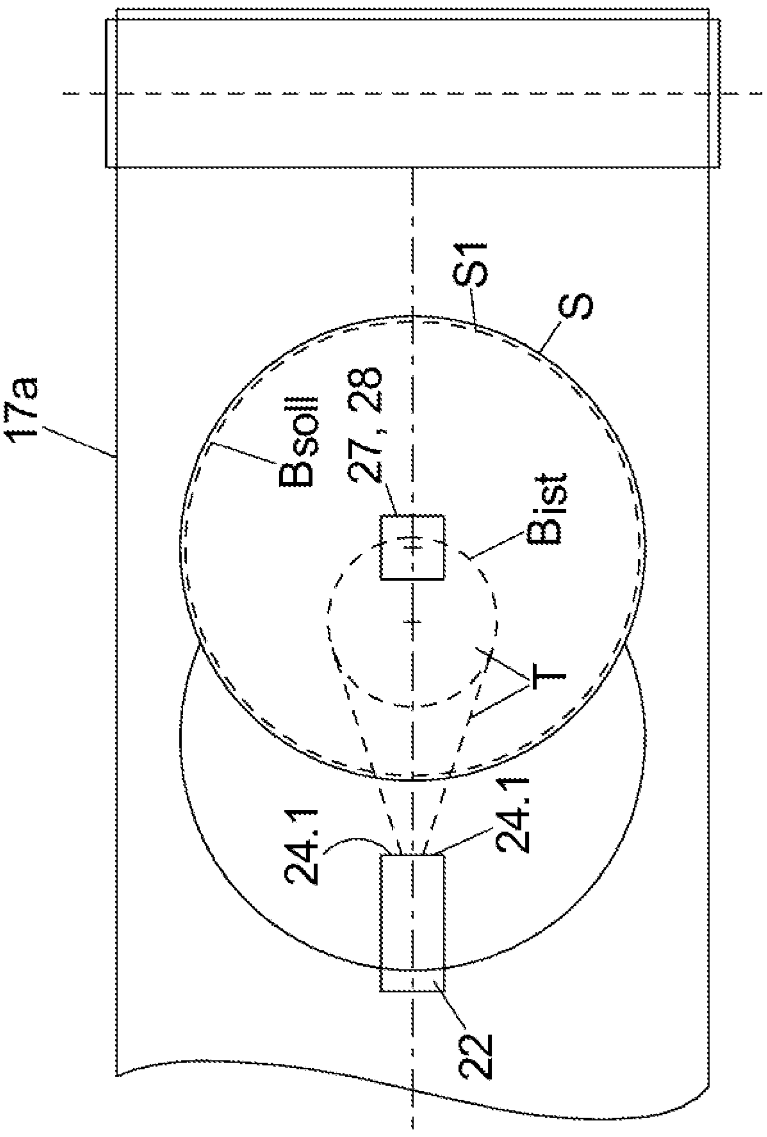
FIG. 3*b*: the application situation according to FIG. 3*a* in top view, FIGS. 4*a, b*: the spray unit in enlarged side view according to FIGS. 2*a, b* and the functional positions shown there.

The latter is the case here, because according to FIG. 3*b* the actual anticaking agent image Bist is too small and lies within the target anticaking agent image Bsoll, but is offset eccentrically in the transport direction 10.

This is detected by the control 1*, which automatically moves the spray unit 22 further away from the application point on the portioning belt 17*a*, the slice S, in the opposite direction to the spray direction 24' in order to enlarge the area on which there is target anticaking agent T, i.e., the target anticaking agent image Bist, to the size of the target anticaking agent image Bsoll.

The fact that this reduces the amount of anticaking agent per unit area within the last area—at least if the application time of anticaking agent remains the same—can usually be accepted or compensated for by extending the application time, i.e., the impact.

In order to arrange the anticaking agent image Bist centrally therein, the spray unit 22, which can be pivoted about a pivot axis running in the transverse direction 11, is automatically pivoted accordingly about this pivot axis by the control system.

In addition, there is an inspection unit 28, for example also a camera—which can also be functionally combined with the detection unit 27—which, before the spray unit 22 dispenses the anticaking agent T, checks whether there is a slice S at all on the intended application point, in this case on the impact point of a slice S on the portioning belt 17*a*, which slice S is also not yet coated with anticaking agent on its upper side.

Only when this is the case and is reported to the control 1*, does the control 1* cause the spray unit 22 to dispense anticaking agent T. The spray unit 22 can also be used to dispense anticaking agent.

Figure 5:
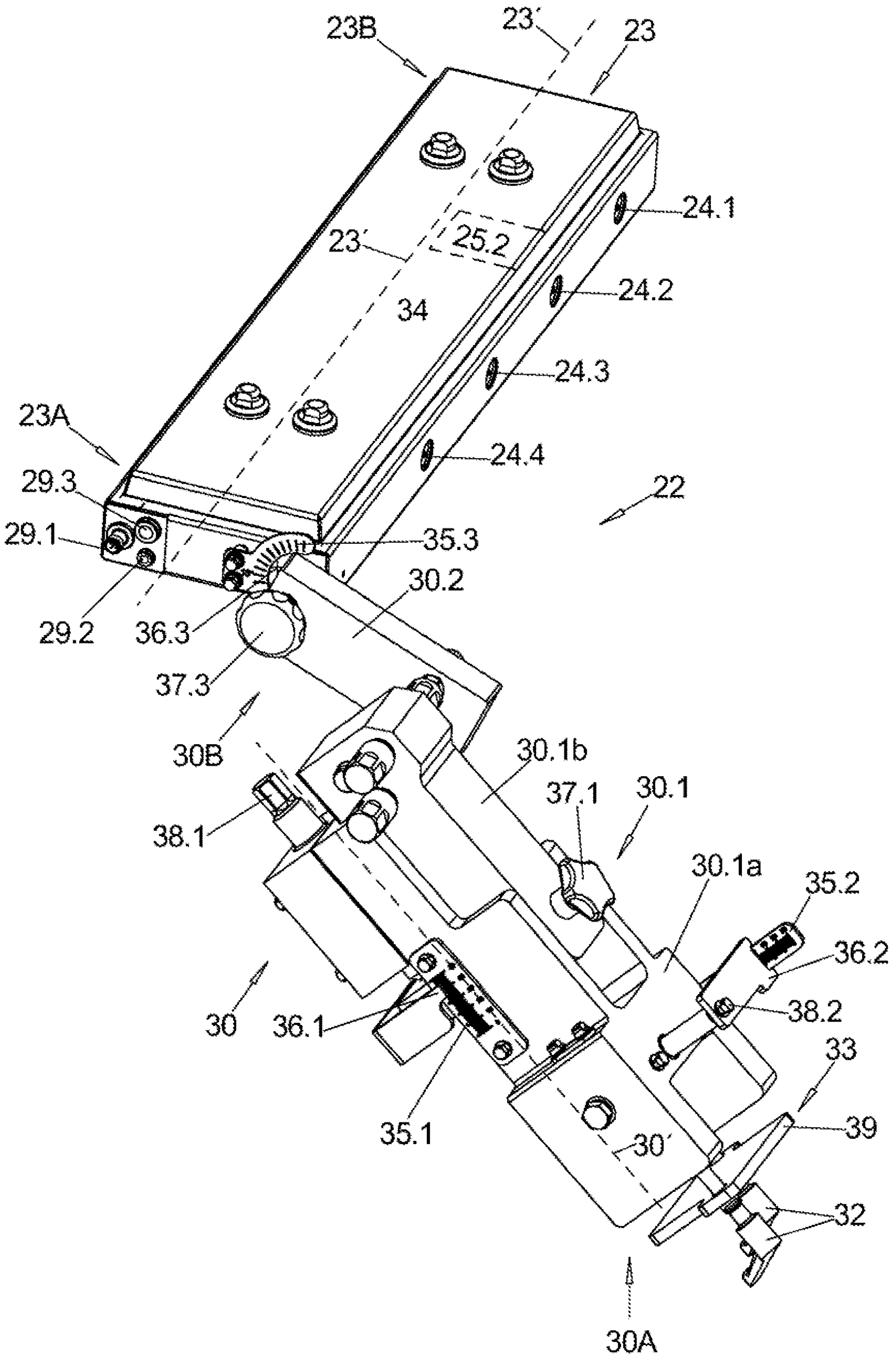
FIG. 5: a spray unit alone in perspective view.

The spray unit 22 can be embodied as a spray bar 23, in particular with several spray openings 24.1-24.4 distributed in the transverse direction 11, which is shown separately in FIGS. 4*a, b* in the slicing machine and in FIG. 5, but including its holding unit 30.

The spray bar 23 of the spray unit 22 extending in transverse direction 11 is in FIG. 2*a* in such a pivoted position about the transverse direction 11, which is at the same time the longitudinal extension 23' of the spray bar 23, that the nozzle units 25 mounted on the right-hand narrow side of the spray bar 23 in FIG. 2*a* point with the spray direction 24' of their spray nozzles 24 approximately horizontally to the rear against the passage direction 10* and are directed against the end face of the caliber K or the spray nozzle 24 projecting from the cutting frame. K1, which is sprayed with anticaking agent T before it is separated as a slice S from the blade 3.

In FIG. 2*b*, on the other hand, the spray bar 23 is rotated about its longitudinal direction 23' in such a way that the spray direction 24' points obliquely downwards to the rear and thus to the upper side of the last slice S already deposited on the portioning belt 17*a*, which is coated with the anticaking agent T when the spray nozzle 24 is activated.

As can be seen more clearly from the perspective view in FIG. 5 of the spray unit 22 alone, the spray unit 22 preferably consists on the one hand of the spray bar 23, in which the nozzle units 25.1-25.4 with the respective spray opening 24.1 to 24.4 are arranged in a peripheral wall facing in particular against the passage direction 10*, i.e., to the rear, and on the other hand a holding device 30 with which the spray bar 23 can be fastened to the base frame 2 of the machine 1.

According to FIGS. 2*a, b*, the attachment is made to the cross-member 2*a* of the base frame 2, which rises obliquely from the rear and is present in plan view at least on the operator side facing the operator, as FIG. 1*a* shows.

The holding device 30 is thus fastened to the base frame 2 with its rear end section 30A in the passage direction 10* and carries on its other end section 30B, which is located further forward and further up in the assembled state, the spray bar 23, which is fastened to the end section 30B of the holding device 30 in a cantilevered manner on one side, namely with its end section 23A, and extends from there with its longitudinal direction 23' in the transverse direction 11, preferably over all tracks SP1 to SP4 of the slicing machine 1.

As shown in FIGS. 4*a, b* and 5, the hollow spray bar 23 is beam-shaped with, in this case, four circumferentially adjoining peripheral walls extending in its largest direction of extension, the longitudinal direction 23', enclosing a rectangular cross section, the end faces of the spray bar 23 also being tightly closed.

In one of the two wider, here the upwardly directed, peripheral walls 23*b* of the rectangular periphery there is a large-area opening which extends substantially over the entire length and which, as can be seen in FIG. 5, can be tightly closed by a bar cover 34 which can be fitted and screwed on tightly.

In the adjacent narrower peripheral wall 23*a*, which in the assembled state is directed against the direction of flow 10*, the nozzle units 25.1-25.4 with their spray openings 24.1 to 24.4 are mounted in corresponding passages, the, e.g., approximately cylindrical part of the nozzle units 25.1-25.4 extending from the passage into the interior of the spray bar 23.

In order to be able to re-produce the swivel position of the spray bar 23 about its longitudinal direction 23', an arc-shaped scale 35.3 is arranged on the operator-side end face of the spray bar 23 and a pointer 36.3 is arranged on the tilting arm 30.2, which points to the markings of the scale 35.3.

The corresponding tilting position between tilting arm 30.2 and spray bar 23 is fixed by tightening a handwheel 37.3, with which the spray bar 23 can be clamped in the set rotational position relative to the tilting arm 30.2.

Irrespective of the presence of the tilting arm 30.2, the support device 30, in particular its main arm 30.1, can consist in the longitudinal direction 30'1 the greatest direction of extension of the beam-shaped holding device 30—of two parts which can be displaced relative to one another and thus telescoped, in this case a base part 30.1*a*, on which the clamping device 33 for fixing to the base frame 2 is located, and a support part 30.1*b*, on which either the tilting arm 30.2 or directly the spray bar 23 is fixed.

The extent to which the support part 30.1*b* is pulled out of the base part 30.1*a* is again indicated by means of a linear scale 35.1 and a pointer 36.1 referring thereto, one of which is fixed to the base part 30.1*a* and the other to the support part 30.1*b*. The set extension position is again fixed by means of a handwheel 37.1, by means of which a clamping screw connected thereto in a rotationally fixed manner is actuated, which clamps the two parts against each other.

In the released state of this clamping device, the relative longitudinal movement from base part 30.1*a* to support part 30.1*b* can be effected by means of a threaded spindle, the drive journal 38.1 of which is in the form of an external hexagon, which in this case projects from the front end face of the main part 30.1*a* facing the spray bar 23.

In addition, the holding device 30, in this case the main part 30.1, in particular its base part 30.1*a*, can be adjusted relative to the clamping device 33 in a transverse direction to the longitudinal direction 30' of the holding device 30 or of its main part 30.1, the adjustment direction of which is also transverse to the transverse direction 11, the longitudinal direction 23' of the spray bar 23.

There, too, a scale 35.2, linear in this case, and a pointer 36.2 pointing to it are provided for indicating the transverse adjustment, one part of which is fixed to the clamping device 33 and the other to the holding device 30, in particular its main part 30.1.

The set transverse adjustment can also be fixed here by a clamping device not shown. In the released state of this clamping device, this transverse adjustment can be effected by means of a threaded spindle whose drive journal 38.2 in the form of an external hexagon in this case projects from the upper side of the main part 30.1*a*.

LIST OF REFERENCES

1 slicing machine, slicer
1* Control
2 Base frame
3 Blade
3 rotation axis
3" blade plane, cutting plane
3*a* Cutting edge
4 Feed conveyor, feed belt
5 cutting frame
6*a-d* product opening
7 cutting unit
8 upper product guide, upper guide belt
8.1 contact run, lower run
8*a* cutting side deflecting roller
8*b* deflecting roller facing away from the cutting side
9 bottom product guide, lower guide belt
8.1 Contact run, upper run
9*a* cutting side deflecting roller
9*b* deflecting roller facing away from the cutting side
10 Transport direction, longitudinal direction, axial direction
10* Passage direction through machine
11 1. transverse direction (width slicer)
12 2nd transverse direction (height-direction caliber)
13 Gripper unit, gripper slide
14,14 *a-d* gripper
15 spacer
16 Gripper claw
17 discharge conveyor unit
17*a, b, c* portioning belt, discharge conveyor
18 Gripper guide
19 Height sensor
20 Feed unit
21 End piece conveyor
22 Spray unit
23 Spray bar
23' longitudinal direction
23' nozzle plane
24.1-.4 Spray opening, spray nozzle
24' Spray direction

25.1, 25.2 Nozzle unit
26 Spray distance
27 Detection unit, camera
28 Inspection unit, camera
29.1-29.3 Contact
30 Holding device
30A, B End section
30' Longitudinal direction
30.1 Main arm
30.1*a* Base part
30.1*b* Support part
30.2 Tilting arm
31' Transverse axis
32 Tensioning nut
33 Clamping device
34 Bar cover
35.1-35.3 Scale
36.1-36.3 Pointer
37.1, 37.3 Handwheel, clamping screw
38.1, 38.2 Drive journal
39 Press plate
Bist Actual anticaking agent image
Bsoll Target anticaking agent image
K Caliber, product caliber
KR End piece
P Portion
S Slice
S1, S2 main surface
T Anticaking agent

The invention claimed is:

1. A slicing machine for slicing calibers into slices, comprising:

a cutting unit, a feed unit for feeding a caliber to the cutting unit, a discharge conveyor unit with at least one discharge conveyor belt, a spray unit with a spray opening for applying a liquid or powdery anticaking agent to a main surface of a slice to be produced from the caliber or already produced from the caliber, the spray unit being arranged and embodied in such a way that the spray opening is operable to apply the anticaking agent in a direction of one slice at a time, a control for controlling moving parts of the slicing machine, wherein the spray unit as well as the control are configured in such a way that coating of the main surface of the slice with the anticaking agent is maximized and anticaking agent exposure to parts of the slicing machine located away from the slice is minimized, wherein a spray direction of the spray opening is automatically adjustable in a controlled manner during slicing operation of the slicing machine, and the spray unit comprises a detection unit, which is capable of detecting an actual interface image generated by the spray opening on the main surface of the slice with respect to position of the actual interface image on the main surface, the detection unit is coupled to the control, and the control is configured to determine necessary adjustment of the spray direction of the spray opening and/or of a spray distance of the spray opening by comparison of the actual interface image with a predetermined desired interface image, and to adjust the spray opening accordingly.

2. The slicing machine according to claim 1, wherein the spray distance comprises a distance of the spray opening from a cutting plane of the cutting unit and/or a distance of the spray opening from a support surface of the at least one discharge conveyor belt.

3. The slicing machine according to claim 1, wherein the spray unit comprises an inspection unit, which is capable of checking presence of a main surface of a slice not yet coated with the anticaking agent at an application position for application of the anticaking agent, the inspection unit is coupled to the control, and the control is capable of activating the spray opening only in the presence of the main surface not yet coated with the anticaking agent at the application position.

4. The slicing machine according to claim 1, wherein the spray unit comprises a spray bar extending in a transverse direction over multiple tracks of the slicing machine, and the spray unit comprises a holding device to which the spray bar is fastened in a controllably adjustable manner.

5. The slicing machine according to claim 4, wherein the holding device is rod-shaped with a longitudinal direction, the spray bar is automatically pivotable in a controlled manner relative to the holding device about an axis that extends in a longitudinal direction of the spray bar, and/or the spray bar is automatically adjustable in a controlled manner relative to the holding device along the longitudinal direction of the holding device.

6. The slicing machine according to claim 4, wherein the holding device comprises a main arm, and a tilting arm which is pivotable relative to the main arm about a transverse axis that is transverse to a longitudinal direction of the holding device and to which the spray bar is fastened.

7. The slicing machine according to claim 6, wherein the main arm of the holding device is adjustable in length.

8. A method for operating a slicing machine, the method comprising:

applying, with a spray unit, anticaking agent to a main surface of a slice to be or already produced, wherein the spray unit comprises a spray opening configured to apply the anticaking agent in a direction of one slice at a time, wherein coating of the main surface of the slice with the anticaking agent is maximized, and/or delivery of the anticaking agent away from the slice is minimized, and wherein a spray direction of the spray opening is automatically adjustable in a controlled manner during a slicing operation of the slicing machine, an actual interface image produced by the spray opening on the main surface of the slice is detected with respect to size and position of the actual interface image on the main surface, and a spray direction of the spray opening and/or a spray distance of the spray opening are automatically adjusted in such a way that the actual interface image corresponds to a predetermined interface image.

9. The method according to claim 8,
wherein
the spray distance comprises a distance of the spray opening from a cutting plane of a cutting unit of the slicing machine and/or a distance of the spray opening from a support surface of a discharge conveyor unit of the slicing machine.

10. The method according to claim 8, wherein
application time for the anticaking agent per main surface is adjusted automatically in a controlled manner during a slicing operation of the slicing machine,
and/or
application quantity per time unit for the anticaking agent is automatically adjusted in a controlled manner during the slicing operation of the slicing machine,
and/or
size of the spray opening for the anticaking agent is automatically adjusted in a controlled manner during the slicing operation of the slicing machine,
and/or
the applying comprises applying, with the spray unit, the anticaking agent to a front end face of a caliber, which front end face forms the main surface of the slice to be produced from the caliber, wherein during the applying of the anticaking agent to the front end face of the caliber, delivery of the anticaking agent from the spray opening is already started before the front end face is released by a blade of a cutting unit of the slicing machine rotating past the front end face.

11. The method according to claim 8, wherein
presence of a main surface of a slice not yet coated with the anticaking agent is checked at an application position for the applying of the anticaking agent, and
the spray opening is activated only if the main surface not yet coated with the anticaking agent is present at the application position.

12. The method according to claim 8, wherein
the spray unit comprises a spray bar, and when product to be sliced by the slicing machine is changed and/or number of tracks or track distance of the slicing machine is changed, the spray bar is changed or a spray distance and/or a spray direction of the spray bar are/is adjusted.

13. The slicing machine according to claim 1, wherein the detection unit comprises a camera.

14. The slicing machine according to claim 3, wherein the inspection unit comprises a camera.

15. The slicing machine according to claim 7, wherein the main arm is telescopically adjustable in length.

16. The slicing machine according to claim 7, wherein the slicing machine comprises a base frame, and the main arm of the holding device comprises a base part which is fastenable to the base frame, and a support part which is adjustable in an automatically controlled manner relative to the base part in the longitudinal direction of the holding device.

17. A slicing machine for slicing calibers into slices, the slicing machine comprising:
a cutting unit;
a feed unit for feeding a caliber to the cutting unit;
a spray unit with a spray opening for applying a liquid or powdery anticaking agent to a main surface of a slice to be produced from the caliber or already produced from the caliber by the cutting unit; and
a control;
wherein a spray direction of the spray opening is automatically adjustable in a controlled manner during slicing operation of the slicing machine, the spray unit comprises a detection unit coupled to the control and configured to detect an actual anticaking agent image of the anticaking agent deposited on the main surface of the slice by the spray opening, and the control is configured to adjust the spray unit-direction of the spray opening and/or a spray distance of the spray opening based on a comparison of the actual anticaking agent image with a predetermined target anticaking agent image.

* * * * *